United States Patent

Marquardt et al.

[11] Patent Number: 5,311,643
[45] Date of Patent: May 17, 1994

[54] HINGE FOR A FOLDABLE RAIL SECTION FOR MOUNTING A CONTAINER OF AN OXYGEN SUPPLY UNIT IN AN AIRCRAFT

[75] Inventors: Wolfgang Marquardt; Roderich Thometschek, both of Stockelsdorf; Wolfgang Rittner, Bad Schwartau; Alfred Rother; Holger Wollnik, both of Lübeck; Christoph Bauer, Ibbenbüren; Christian Schnoor, Lübeck, all of Fed. Rep. of Germany

[73] Assignee: Dragerwerk AG, Lubeck, Fed. Rep. of Germany

[21] Appl. No.: 985,882

[22] Filed: Dec. 4, 1992

[30] Foreign Application Priority Data

Dec. 6, 1991 [DE] Fed. Rep. of Germany ....... 4140266

[51] Int. Cl.$^5$ ............................................. E05D 7/10
[52] U.S. Cl. ........................................ 16/267; 220/338; 16/374
[58] Field of Search ................... 220/337, 338, 343; 206/803; 16/267, 374; 128/204.18, 206.27

[56] References Cited

U.S. PATENT DOCUMENTS

| | | | |
|---|---|---|---|
| 3,126,120 | 3/1964 | Crate | 220/343 |
| 3,503,394 | 3/1970 | Hotz et al. | 128/206.27 |
| 3,663,990 | 5/1972 | Shane | 220/337 |
| 3,981,302 | 9/1976 | Veit | 128/206.27 |

Primary Examiner—Lowell A. Larson
Assistant Examiner—Donald M. Gurley
Attorney, Agent, or Firm—McGlew and Tuttle

[57] ABSTRACT

A hinge for a foldable rail section for mounting a container of an oxygen supply unit in an aircraft, with a first hinge part on the rail section and a second hinge part on the edge of the container, and with a container door, which extends in parallel to the longitudinal side of the rail section and is pivotable around a joint on the rear edge of the container. The connection of the hinge to the container is simplified, and a stop is provided for the container door. The first hinge part is formed as of a bead (11), which is made in one piece with sections of the longitudinal side of the rail section (9), wherein slots (12) are present in the sections of the bead (11) not made in one piece with the rail section, and the second hinge part is formed as tongues (13) made in one piece with the rear container edge (4) corresponding to the outer shape of the bead (11), and the said tongues extend into the slots (12), and the tongues (13) are raised at the tongue end (15) such that the tongue ends (15) form a stop limiting the pivoting stroke of the container door.

12 Claims, 3 Drawing Sheets

HINGE FOR A FOLDABLE RAIL SECTION FOR MOUNTING A CONTAINER OF AN OXYGEN SUPPLY UNIT IN AN AIRCRAFT

FIELD OF THE INVENTION

The present invention pertains to a hinge for a foldable rail section for mounting a container of an oxygen supply unit in an aircraft, with a first hinge part on the rail section and a second hinge part on the edge of the container, and with a container door, which extends in parallel to the longitudinal axis of the rail section and is pivotable around a joint on the container.

BACKGROUND OF THE INVENTION

An oxygen supply unit with a foldable rail section for mounting the complete unit in an aircraft has become known from U.S. Pat. No. 4,840,171 (corresponding to DE-A1 37,19,427). Such oxygen supply units are arranged in the ceiling structures of aircraft and are used to supply the passengers with the oxygen needed for respiration in the case of need. The oxygen supply unit consists of a container, in which a plurality of oxygen masks and an oxygen generator are arranged, and of a container door, which is pivotable around a joint and is used to close the container.

Foldable rail sections, which extend in parallel to the joint of the container door, and with which the complete oxygen supply unit can be suspended in a holder in the ceiling structure of the aircraft, are arranged at the front and rear edges of the container. The rail sections are used for the simple fastening of the oxygen supply unit in the ceiling structure, on the one hand, and, on the other hand, they also facilitate removal, because the complete oxygen supply unit can be removed from the ceiling structure without tools. Since the oxygen supply units are associated with the passengers and are therefore present on board in large numbers, especially in large-capacity aircraft, they must be optimized in terms of both minimal weight and the possibility of manufacture at low cost. On the other hand, parts subject to wear, e.g., the rail section, must be able to be replaced in a simple manner at the time of maintenance.

The rail sections are usually fastened to the container with a type of piano hinge on the container, with a bar pushed through as the axis of rotation. If the rail section is to be replaced, the bar must first be pulled out of the piano hinge, and the rail section must then be removed from the container. The joint of the container door consists of individual bearing blocks, which are screwed onto the edge of the container as separate components, and of a bar, pushed through, which acts as the axis of rotation for the container door. Besides fastening the container door, the bearing blocks also act as a stop in order to limit the pivoting stroke of the container.

It is disadvantageous in the prior-art oxygen supply unit that both the hinge for the rail sections and the joint of the container door with the bearing blocks require a plurality of individual parts, which is disadvantageous in terms of both the manufacturing costs and the weight of the device. In addition, replacement of the rail sections is made difficult by the fact that the bar forming the axis of rotation must be pulled out of the piano hinge.

West German Utility Pat. No. DE-GM 19,57,658 illustrates a hinge for the cover of a plastic box, wherein the hinge parts are made directly in one piece with the cover and the box, respectively, and consist of two slots at the edge of the cover, and semicircular tongues of the box extend into the said slots.

The manufacture of such a hinge is made difficult by the fact that the limiting webs of the slots on the cover are bent down at right angles, and have a bead, which is located between the limiting bars and acts as the fulcrum point for the hinge, only there, offset by a step from the flat surface of the cover. In addition, the prior-art hinge has no stop function for the pivoting stroke of the cover.

SUMMARY AND OBJECTS OF THE INVENTION

The basic object of the present invention is to simplify the connection of the hinge of the rail section to the container and to form a stop for the container door at the same time.

This object is attained by the first hinge part comprising a bead made in one piece with the rail section over parts of its longitudinal side, wherein slots are provided in the sections of the bead which are not made in one piece with the rail section, and by the second hinge part comprising tongues, which are made in one piece with the rear and/or front edge of the container corresponding to the outer shape of the bead, and which extend into the slots, and by the tongues of the rear edge of the container being raised at the tongue end such that the tongue ends form a stop limiting the pivoting stroke of the container door.

The advantage of the present invention is essentially the fact that the first hinge part located on the rail section can be inserted into the second hinge part without additional components, and that the function of the hinge results from the positive locking of the first hinge part with the second hinge part. The slots may be designed as openings in the rail section in the area of the section of the bead that is not made in one piece with the rail section. By raising the tongues at the rear edge of the container at the tongue end, the tongue end forms a stop, which limits the pivoting stroke of the container door. To remove the rail section, it is grasped at one end, and pulled out of the tongues in the manner of a zipper. Mounting of the rail section is performed in the reverse order.

It is advantageous to design the second hinge part such that elastic projections, which are made in one piece with the front and/or rear container edge and surround the bead at least partially, are present between two adjacent tongues. The projections act as a flexible locking device for the bead, and they are intended to prevent the first hinge part from jumping out of the tongues during the rotary movement. During removal of the first hinge part, the projections yield because of their elasticity, and the bead can be pulled out of the tongues.

To improve the pivotability of the container door, it is advantageous for the break between the tongue and the tongue end at the rear container edge to be located below the joint of the container door.

Particularly simple manufacture of the second hinge part is made possible by the bead having a cross-sectional area reduced by the thickness of the tongue in the area of the slots.

To stabilize the container door, it is advantageous to select the length of the raised tongue end to be such that it will lie on the inner side of the container door when the container door is closed.

To improve the introduction of the forces acting on the tongues into the container edge, it is advantageous to provide the front and/or rear container edge with bead-shaped depressions in the area of the tongues. The depressions increase the flexural strength of the container edge in the area of the tongues and additionally impart increased dimensional stability on the container edge.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
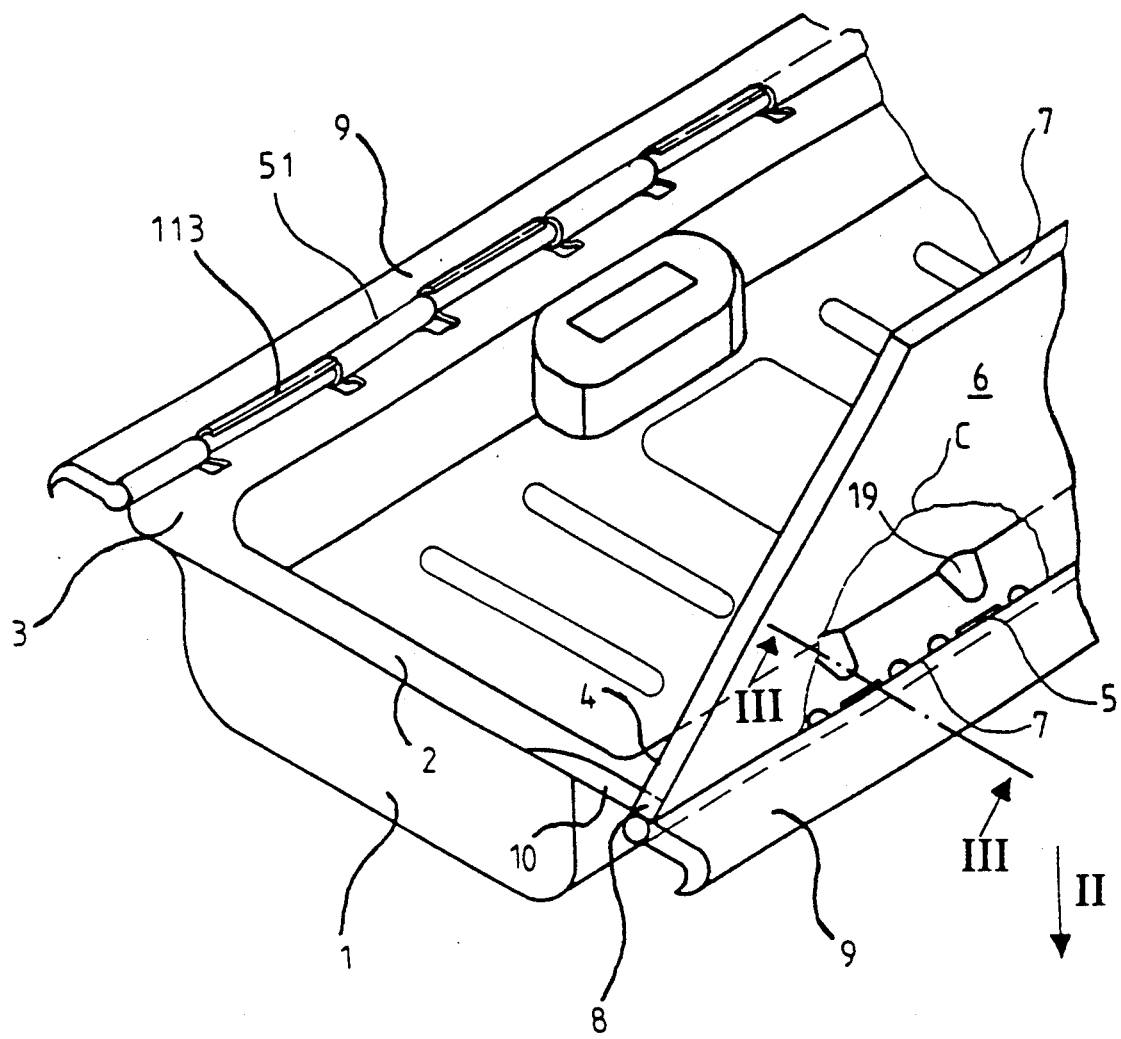
FIG. 1 is a perspective partially cut away view of a container for an oxygen supply unit.

FIG. 1 shows a partial perspective view of a container 1 for an oxygen supply unit (not shown in FIG. 1). The container 1 is made of aluminum plate as a one-piece molding, with a circumferential container edge 2. One rail section 9, with which the container 1 is fastened in the aircraft, is arranged on a front container edge 3 and a rear container edge 4 each. The rail sections 9 are rotatable around a hinge 5 on the rear container edge 4 and around a hinge 51 on the front container edge 3.

The container 1 can be closed with a box-like container door 6. The container door 6 has a circumferential door edge 7, which lies on the container edge 2 and the front container edge 3 in the closed position; the container door 6 is pivotable around a joint (pivot axis) 8. The joint 8 is designed such that the side parts of the rear container edge 4 are bent up as a plate fold 10 and are connected to the door edge 7 of the container door 6 by a pin (not shown in FIG. 1). Only one of joint 8 is shown in FIG. 1. The second joint has an equivalent design, and is located on the opposite side. The container door 6 is broken off along the section edge C, so that the hinge 5 for the rail section 9 and the door edge 7 are visible.

Figure 2:
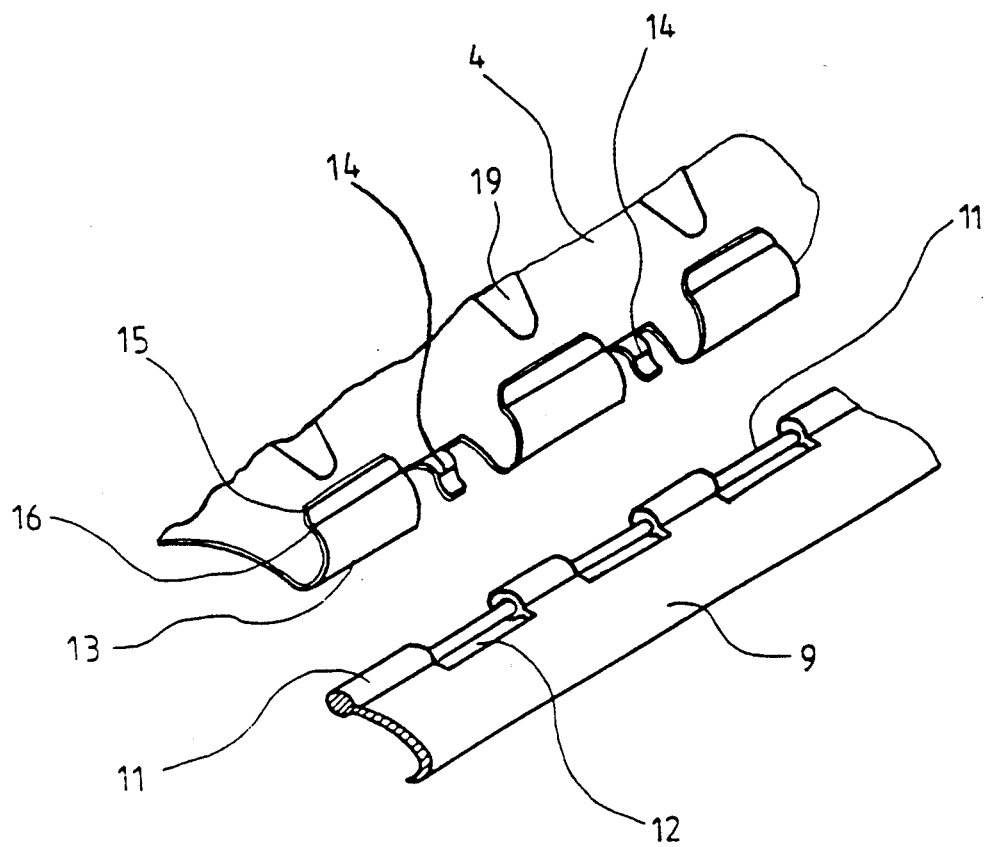
FIG. 2 is a perspective partially sectional representation of the hinge in viewed in the direction of arrow II according to FIG. 1.

In FIG. 2, the hinge 5 is shown as a detail in the view taken in the direction of arrow II according to FIG. 1. Identical components are designated by the same reference numerals as in FIG. 1. The hinge 5 consists of a first hinge part and a second hinge part, wherein the second hinge part is formed by a bead 11 made in one piece with some sections of the rail section 9, and the sections of the bead 11 which are not made in one piece with the rail section are designed as slots 12. The first hinge part comprises individual tongues 13, which extend into the slots 12 and are shaped corresponding to the outer shape of the bead 11. The hinge parts are shown in the disassembled state in FIG. 2. In the area of the tongues 13, the bead 11 is designed such that the cross-section area is approximately reduced by the thickness of the material of the tongue 13. Projections 14, which are also made in one piece with the rear container edge 4, and are used to push the bead 11 into the tongues or to prevent the bead from jumping out of the tongues 13 during the rotary movement, are located between the two tongues 13. The projections 14 also slide on the bead 11. The tongues 13 are bent up vertically at a break 16 at the tongue end 15, as a result of which a stop limiting the pivoting stroke of the container door 6 is formed. To mount the rail section 9, a tongue 13 is first introduced into the corresponding slot 12 after which this is continued with the other tongues 13 and the slots 12 in a zipper-like manner. At the rear container edge 4, bead-shaped depressions 19, which extend with tapering cross-section areas toward the tongues 13, are provided in the area of the tongues 13. The depressions 19 are intended only to improve the introduction of force from the tongues 13 into the rear container edge 4, and additionally impart increased dimensional stability on the rear container edge 4.

The hinge 51 (FIG. 1) on the front container edge 3 has a design equivalent to that of the hinge 5 on the container edge 4, the difference being that the tongues 113 on the front container edge 3 do not have the raised tongue end 15.

Figure 3:
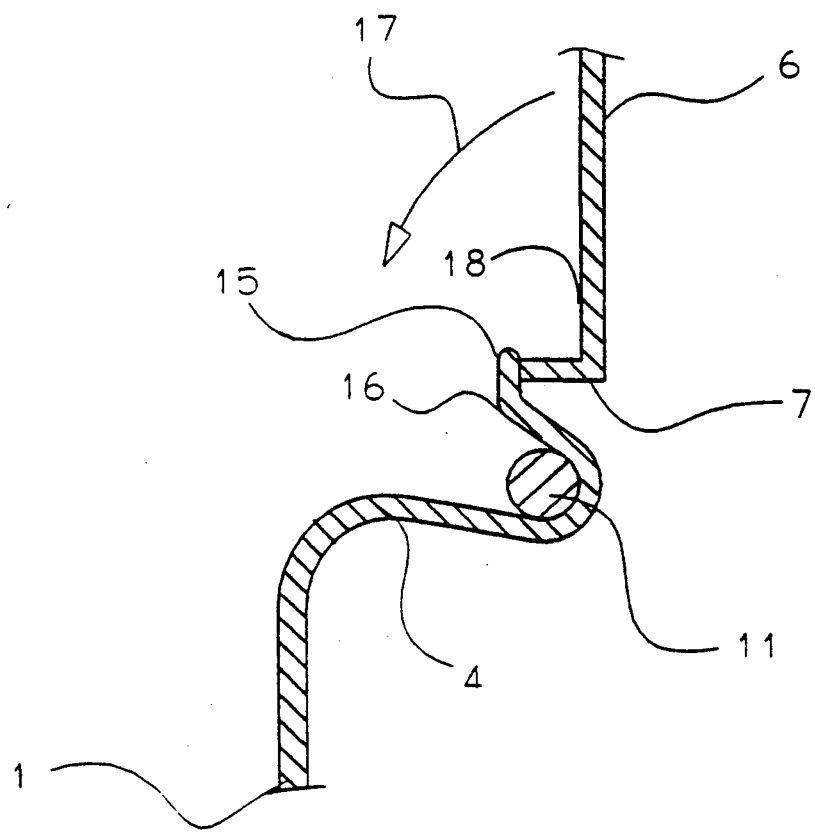
FIG. 3 is a sectional representation taken along line III—III of FIG. 1.

FIG. 3 shows the sectional representation along line III—III according to FIG. 1. Identical components are designated by the same reference numerals as in FIGS. 1 and 2. To achieve uniform contact between the door edge 7 and the container edge 2, the rear container edge 4 is bent off in the downward direction. To accomplish the stop function at the tongue end 15, i.e., the stop of the door edge 7 at the tongue end 15, the break 16 is located under the joint 8 of the container door 6.

In FIG. 3, the lower door edge 7 strikes the tongue end 15. The arrow 17 illustrates the direction of closing of the container door 6.

The length of the tongue end 15 is selected to be such that when the container door 6 is closed, the tongue end just strikes the inner side 18 of the container door. Both uniform contact and protective effect of the container door 6 in the area of the rear container edge 4 are thus achieved.

While a specific embodiment of the invention has been shown and described in detail to illustrate the application of the principles of the invention, it will be understood that the invention may be embodied otherwise without departing from such principles.

What is claimed is:

1. A container and hinge, comprising:
    a container of an oxygen supply unit for an aircraft;
    a foldable rail section for mounting the container;
    a container door connected at an edge of the container, said container door extending in parallel to a longitudinal side of said rail section and being pivotable around a pivot axis on a rear part of said edge of said container;
    a first hinge part on the rail section, said first hinge part including a bead integrally formed with a sequence of sections of a longitudinal side of the rail section, slots being provided between said bead and said longitudinal side of the rail section, said slots being provided adjacent sections of said bead which are not integrally formed with the sections of the longitudinal side of the rail section; and
    a second hinge part including tongues formed integrally in one piece with a rear container edge and a front container edge, an outer surface of said tongues being adapted to a circumferential shape of said bead, said tongues extending into said slots, said tongues of said rear container edge being raised at a tongue end, whereby said tongue end defines a stop limiting a pivoting stroke of said container door.

2. A container and hinge according to claim 1, wherein:

between two adjacent tongues, said second hinge part is provided with elastic projections formed in one piece with one of said front and rear container edge, said elastic projections surrounding said bead, at least partially, on one of said front and rear container edge.

3. A container and hinge according to claim 1, wherein:

said rear container edge is bent such that a break formed between said tongue and said tongue end on said rear container edge is located under said pivot axis of said container door.

4. A container and hinge according to claim 1, wherein:

said bead has a cross sectional area reduced by a thickness of said tongues in an area of said slots.

5. A container and hinge according to claim 1, wherein:

said raised tongue end has a length dimensioned such that said raised tongue end is in contact with an inner side of said container door when said container door is closed.

6. A container and hinge according to claim 1, wherein:

said second hinge part on said container edge has bead-shaped depressions in an area of said tongues.

7. A container and hinge assembly, comprising:

a container of an oxygen supply unit for an aircraft, the container having an edge;

a foldable rail section for mounting said container, said rail section including a plurality of spaced apart rail section parts on a longitudinal side of said rail section;

a container door extending in parallel to a longitudinal side of said rail section, said container door being connected to said container pivotable around a pivot axis on a rear container edge;

a first hinge part provided on said rail section, said first hinge part including a bead with a bead part formed integrally on each spaced apart rail section of said longitudinal side of said rail section, and a bead part not formed integrally with said rail section, and slots formed in said rail section, each slot being adjacent to a said bead part not made in one piece with said rail section; and a second hinge part including tongues formed in one piece with said rear container edge, said tongues having a shape corresponding to a circumferential shape of said bead, said tongues extending into said slots, said tongues of said rear container edge being raised at a tongue end with said pivot axis positioned above said tongues, whereby each said tongue end defines a stop limiting a pivoting stroke of said container door.

8. A container and hinge assembly according to claim 7, wherein:

between two adjacent tongues, said second hinge part is provided with elastic projections formed in one piece with said rear container edge, said elastic projections surrounding said bead, at least partially, on said rear container edge.

9. A container and hinge assembly according to claim 7, wherein:

said rear container edge is bent such that a break formed between said tongue and said tongue end on said rear container edge is located under said pivot axis of said container door.

10. A container and hinge assembly according to claim 7, wherein:

said bead has cross sectional area reduced by a thickness of said tongues in an area of said slots.

11. A container and hinge assembly according to claim 7, wherein:

said raised tongue end has a length dimensioned such that said raised tongue end is in contact with an inner side of said container door when said container door is closed.

12. A container and hinge assembly according to claim 7, wherein:

said second hinge part on said container edge has bead-shaped depressions in an area of said tongues.

* * * * *